United States Patent
Wu et al.

(10) Patent No.: US 6,570,986 B1
(45) Date of Patent: May 27, 2003

(54) DOUBLE-TALK DETECTOR

(75) Inventors: Wen-Rong Wu, Hsinchu (TW); Shih-Chen Lin, Miao-Li (TW); Po-Cheng Chen, San-Chong (TW); Chun-Hung Kuo, Taiwan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/385,353

(22) Filed: Aug. 30, 1999

(51) Int. Cl.$^7$ ............................ H04M 9/08; G06F 17/10
(52) U.S. Cl. .......................... 379/406.09; 379/406.01; 379/406.04; 379/406.05; 379/406.08; 708/322
(58) Field of Search .................. 379/406.01, 406.04, 379/406.05, 406.06, 406.08, 406.09, 406.11; 708/322, 323

(56) References Cited

U.S. PATENT DOCUMENTS

| | | | |
|---|---|---|---|
| 4,360,712 A | 11/1982 | Horna | 179/170.2 |
| 4,894,820 A | 1/1990 | Miyamoto et al. | 370/32.1 |
| 5,193,112 A | 3/1993 | Sano | 379/410 |
| 5,483,594 A | 1/1996 | Prado et al. | 379/410 |
| 5,535,194 A | 7/1996 | Ashley et al. | 370/32.1 |
| 5,721,772 A | 2/1998 | Haneda et al. | 379/406.01 |
| 5,764,753 A * | 6/1998 | McCaslin et al. | 379/389 |
| 5,809,463 A | 9/1998 | Gupta et al. | 704/233 |
| 6,088,445 A * | 7/2000 | Chadha et al. | 379/411 |
| 6,185,300 B1 * | 2/2001 | Romesburg | 379/410 |
| 6,223,194 B1 * | 4/2001 | Koike | 708/322 |
| 6,351,532 B1 * | 2/2002 | Takada et al. | 379/406.01 |
| 6,449,361 B1 * | 9/2002 | Okuda | 379/406.01 |

OTHER PUBLICATIONS

Ye et al., "A New Double–Talk Detection Algorithm Based on the Orthogonality Theorem," IEEE Transactions on Communications (1991), 39:1542–45.

Haykin, "Adaptive Filter Theory," Prentice–Hall International Editions (1996), pp. 432–439.

* cited by examiner

Primary Examiner—Binh Tieu
(74) Attorney, Agent, or Firm—Finnegan, Henderson, Farabow, Garrett & Dunner, L.L.P.

(57) ABSTRACT

A communication system includes an echo canceller and double-talk detector. The echo canceller includes an adaptive finite impulse response filter that generates an adaptive filter weight vector. The double talk detector computes a squared norm of the filter weight vector and detects an increase of the squared norm in order to detect double-talk status. Upon detection of double-talk status, operation of the echo canceller is suspended.

13 Claims, 5 Drawing Sheets

DOUBLE-TALK DETECTOR

BACKGROUND OF THE INVENTION

The present invention relates generally to communication systems and, more particularly, to a double-talk detector for use with an echo canceller.

In long distance telephonic communications, the need for echo cancellation arises from impedance mismatches associated with wire line telephone subscribers and the use of two-wire connections between wire line subscribers and the central telephone offices. Two-wire connections require mixing of transmitted and received telephone signals for exchange between the central telephone office and the wire line subscriber. This mixing results in a portion of a received signal being re-transmitted as an outgoing signal from a receiving or near-end party to a transmitting or far-end party. As a result, the re-transmitted signal may represent a distracting echo in the communications.

While the echo problem described above is referred to as a network echo, another type of echo is acoustic echo. FIG. 1 illustrates a communication system 100 in which acoustic echo can occur. In system 100, a signal x(n) from the far-end party is received and reproduced at a loud speaker 102 of the near-end party. As a result, an acoustic echo signal c(n) can follow an echo path H(n) and be picked up by a near-end microphone 104. As a result, the far-end party may hear the acoustic echo signal c(n) while speaking.

For minimization or elimination of echo of either type occurring in a telecommunications system, there is typically provided an echo canceller. Thus, system 100 includes an automatic echo canceller (AEC) 106 which is coupled to receive the far-end signal x(n) and an echo compensated version e(n) of the near-end signal when a control switch SW1 is closed. Canceller 106 generates an output signal y(n) that is subtracted from a near-end signal d(n) from microphone 104 to yield compensated signal e(n). Thus, when there is no near-end local source signal s(n) being generated, e.g., the near-end party is not speaking, the value of e(n) should be small.

In general, echo canceller 106 comprises an adaptive finite impulse response filter (AFIR). The filter generates a mathematical model of the echo characteristics based on the far-end signal and the echo compensated signal e(n). Generation of the mathematical model includes generation of an adaptive filter weight vector designated W(n). During echo cancellation operation, the AFIR adjusts the weight components of vector W(n) to minimize or eliminate echo. Thus, operation of the filter is typically an iterative process. A more complete explanation of the use of AFIRs for echo cancellation is disclosed in "Adaptive Filter Theory" by S. Haykin, Prentice-Hall International, Inc., $3^{rd.}$ Edition, ISBN:0133979857, which is incorporated in its entirety herein by reference.

Operation of an adaptive filter for echo cancellation is adversely affected by the occurrence of double-talk. Double-talk occurs when both the near-end party and the far-end party are speaking and where the magnitude of the speech signals of the near-end party is much greater than that of the echo, thereby interfering with the operations of the adaptive filter. As a result, the adaptive filter is unable to accurately respond to the near-end party's speaking and the value of the filter weight vector W(n) is not adjusted for effective echo cancellation.

In response to this phenomenon due to double-talk, there have been developed various techniques for detecting the occurrence of double-talk, so that the operation of the AFIR can be temporarily suspended when double-talk occurs. To this end, system 100 includes a double-talk detector (DTD) 108 connected to control switch SW1 to isolate canceller 106 from signal e(n) when double-talk occurs.

One type of conventional detector is a power-type double-talk detector such as disclosed in U.S. Pat. No. 4,360,712. Such a detector calculates a power ratio between the near-end and far-end signals and compares the ratio with a threshold value. Double-talk is deemed to occur when the ratio exceeds the threshold value. Another type is a correlation-type double-talk detector such as disclosed in "A New Double-Talk Detection Algorithm Based on the Orthogonality Theorem" by Ye et al., IEEE Transactions on Communications, Vol. 39, No. 11, Nov. 1991. Such a detector calculates an average cross-correlation (ACC) of an error signal and the far-end signal, and compares the ACC with a threshold value. Double-talk is deemed to occur if the ACC exceeds the threshold. A further type of detector is a linear prediction coefficient (LPC) detector such as disclosed in U.S. Pat. No. 5,483,594. In such a detector, the forward signal is submitted to a finite-impulse-response linear-prediction filter in order to determine a first residual signal of minimal energy. The return signal is submitted to a finite-impulse-response filter the coefficients of which are the same as those of the linear-prediction filter of the forward signal in order to determine a second residual signal. The ratio of the energies contained in the first and second residual signals is calculated. Then it is determined whether the return signal contains components other than the echo components from the forward signal by comparing the calculated ratio to a detection threshold, to thereby determine whether double talk is occurring.

A drawback of the above-described conventional double-talk detectors is that they utilize algorithms that are computationally intensive and/or are sensitive to noise.

SUMMARY OF THE INVENTION

Accordingly, the present invention is directed to a double-talk detector that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described, the invention is directed to a double-talk detector for use with an echo canceller having an adaptive filter, the adaptive filter coupled to receive a far-end signal and an error signal which is a difference between a near-end signal and an output signal of the adaptive filter, the adaptive filter adapting a weight vector used for generating the filter output signal to minimize the error signal. The double-talk detector comprises: means for detecting an increase of a squared norm of the adaptive filter weight vector; and means for determining whether the increase of the squared norm exceeds a predetermined value corresponding to a double-talk condition.

Also in accordance with the present invention there is provided an echo canceller for canceling from a near-end signal an echo received in a far-end signal, comprising: an adaptive filter coupled to receive the far-end signal and an error signal which is a difference between the near-end signal and an output signal of the adaptive filter, the adaptive filter including means for adapting a weight vector, used for generating the filter output signal, to minimize the error signal; and a double-talk detector coupled to receive the weight vector and detect an increase of a squared norm of the weight vector, the detector including means for determining whether the increase exceeds a predetermined value corresponding to a double-talk condition.

Further in accordance with the present invention there is provided a method for detecting double-talk in an echo canceller for canceling from a near-end signal an echo received in a far-end signal, comprising: receiving the far-end signal and an error signal which is a difference between the near-end signal and an adaptive filter output signal; adapting an adaptive filter weight vector to generate the output signal with a value to minimize the error signal; detecting an increase of a squared norm of the weight vector; and determining that a double-talk condition exists when the rate of increase exceeds a predetermined value.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate an embodiment of the invention, and together with the description serve to explain the principles of the invention.

DETAILED DESCRIPTION OF THE PREFERRED EMBODIMENTS

Broadly, embodiments consistent with the present invention comprise a double-talk detector that detects occurrence of double-talk based on a squared norm of the adaptive filter weight vector determined by the automatic echo canceller.

Figure 1:
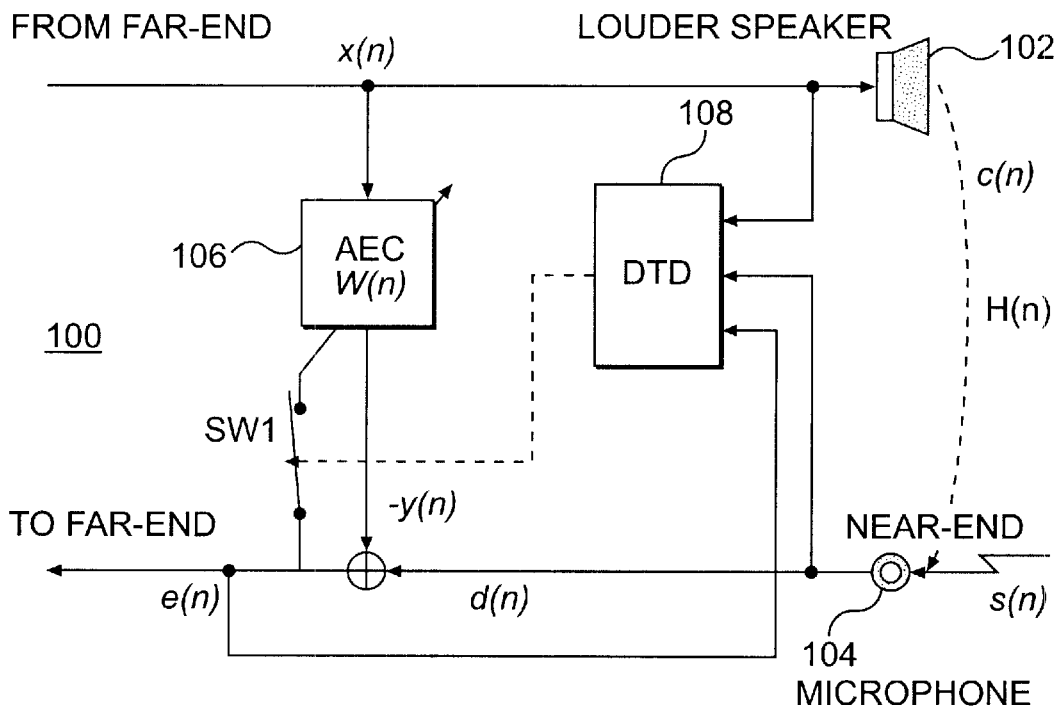
FIG. 1 illustrates a conventional communication system including an echo canceller and a double-talk detector.
Figure 2:
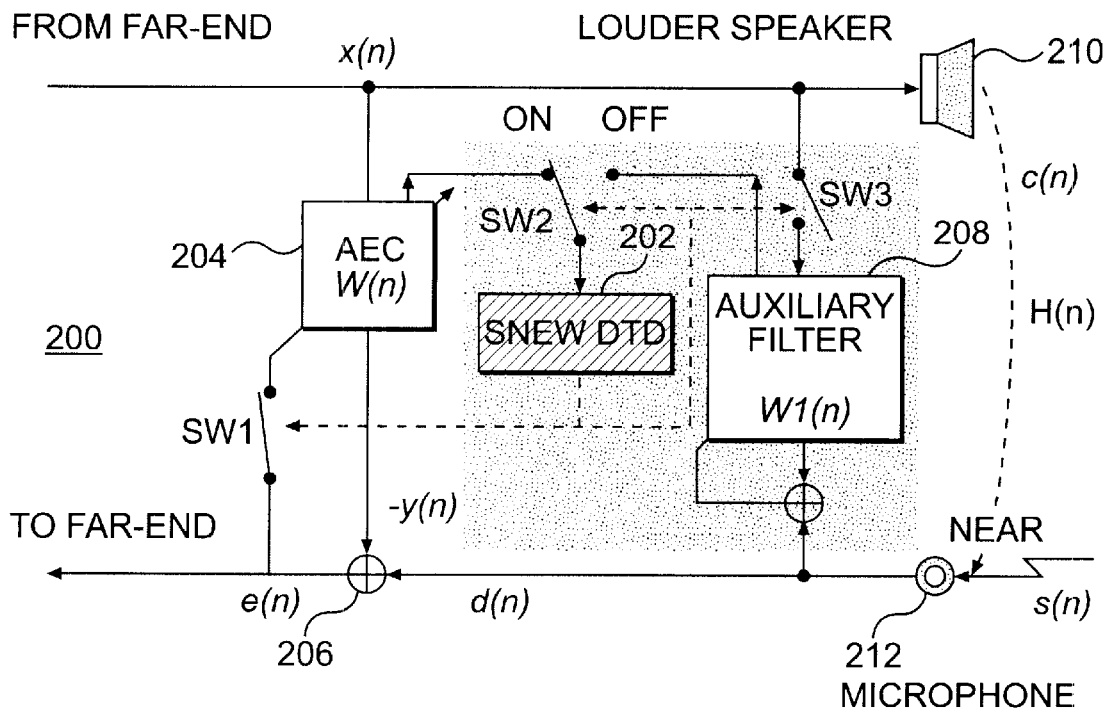
FIG. 2 illustrates a communication system consistent with an embodiment of the present invention.

FIG. 2 illustrates a system 200 including a double-talk detector 202 consistent with the present invention. With reference to FIG. 2, system 200 includes an automatic echo canceller (AEC) 204 coupled to receive the far-end signal x(n) and the near-end echo compensated signal e(n). Canceller 204 includes a conventional AFIR which computes adaptive filter weight vector W(n). The computation is iterative to adapt the weight components of vector W(n) as signals x(n) and e(n) vary during operation. A known adaptation algorithm for updating filter weight vector W(n) is the normalized least mean squares (NLMS) algorithm.

Canceller 204 computes an output signal which represents a model of the echo signal to be canceled from the near-end signal d(n) before transmission to the far-end party. Then, output signal y(n) is subtracted from signal d(n). This can be accomplished, as shown in FIG. 2, by generating a negative value of y(n) for combination with signal d(n) at an adder 206.

Signals x(n), d(n), y(n), and e(n) are all in digital form, and thus, processed in digital form. External analog-to-digital converters (not shown) are provided to convert to digital form the signals received from the far-end and near-end for processing. Additionally, digital-to-analog converters (not shown) are provided for conversion to analog form of signals being output to the far-end party.

Double-talk detector 202 is coupled to receive filter weight vector W(n) via a switch SW2, the operation of which is controlled by detector 202. Detector 202 also controls operation of switch SW1 through which canceller 204 receives signal e(n).

System 200 also includes an auxiliary adaptive filter 208 which computes an adaptive filter weight vector W1(n) when it is connected by a switch SW3 to receive far-end signal x(n). As shown diagrammatically in FIG. 2, the operation of switch SW3 is controlled by detector 202. Auxiliary filter 208 is also connected to receive near-end signal d(n) for this purpose. System 200 further includes a speaker 210 for reproducing the far-end signal x(n) and a microphone 212 for picking up the local source signal s(n) and converting it to near-end signal d(n).

Detector 202 detects the presence of double-talk on the basis of its computation of the squared norm of the adaptive filter weight vector (SNFW). Since the filter weight vector W(n) models the echo path H, its norm remains stable when the echo path is time-invariant. However, even when the echo path response is time varying, the variation in the norm is expected to be small in many cases. When double-talk occurs, the filter weight vector quickly diverges from its optimal solution. Thus, the filter weight vector norm will increase rapidly. In accordance with the invention, this property is used to detector double-talk. However, computation of the filter vector norm is intensive and therefore time consuming. To use the filter vector norm to detect double-talk, while also enabling rapid computation to perform the detection operation, an algorithm for monitoring changes in the squared norm of the filter vector has been developed. The development of the algorithm is described next.

The NLMS algorithm used in canceller 204 to update the weight components of the filter weight vector W can be represented by the following set of equations (1):

$$\begin{cases} y(n) = W(n)X^T(n) \\ e(n) = d(n) - y(n) \\ W(n+1) = W(n) + \tilde{\mu}e(n)X(n) \\ \tilde{\mu} = \dfrac{\mu_0}{|X(n)|^2} \end{cases} \quad (1)$$

In this set of equations, $W(n) = [w(n), w(n-b\ 1), \ldots, w(n-L+1)]$ is the adaptive filter weight vector including its weight components, $X(n) = [x(n), x(n-1), \ldots, x(n-L+1)]$ is the far-end input signal vector, L is the adaptive filter length, $\mu_0$ is the step size of the NLMS algorithm that controls the stability and convergence rate, and $\mu$ is a time-varying step size parameter.

A squared norm p(n) of the adaptive filter weight vector is defined by equation (2) as:

$$p(n) \equiv |W(n)|^2 = \sum_{i=0}^{L-1} w_i^2(n) \quad (2)$$

The AFIR of canceller 204 performs sample-based digital signal processing. Thus, successive values of W(n) and p(n) are computed for successive samples. The difference between two consecutive values of the squared norm is defined by equation (3) as:

$$\Delta p(n) = p(n+1) - p(n) \quad (3)$$

An expression for p(n+1) is developed next using equations (1) and (2) as shown in the following series of equations (4):

$$\begin{aligned}
p(n+1) &= \sum_{i=0}^{L-1} w_i^2(n+1) = |W(n+1)|^2 \quad (4)\\
&= W^T(n+1)W(n+1)\\
&= (W^T(n) + \tilde{\mu}e(n)X^T(n))(W(n) + \tilde{\mu}e(n)X(n))\\
&= |W(n)|^2 + \tilde{\mu}e(n)W^T(n)X(n) +\\
&\quad \tilde{\mu}e(n)X^T(n)W(n) + [\tilde{\mu}e(n)]^2|X(n)|^2\\
&= |W(n)|^2 + 2\tilde{\mu}e(n)y(n) + [\tilde{\mu}e(n)]^2|X(n)|^2\\
&= p(n) + 2\tilde{\mu}e(n)y(n) + [\tilde{\mu}e(n)]^2|X(n)|^2
\end{aligned}$$

Substituting the last expression in equations (4) into equation (3) yields the following equation (5):

$$\Delta p(n) = 2\tilde{\mu}e(n)y(n) + [\tilde{\mu}e(n)]hu\, 2|X(n)|^2 \quad (5)$$

In accordance with the preferred embodiment of the invention, the absolute value of Δp(n), i.e., |Δp(n)|, is used to detect the occurrence of double-talk. Thus, broadly, in operation, with switch SW2 in the position to connect detector 202 to receive the vector W(n), detector 202 calculates Δp(n) in accordance with equation (5). If the calculated value is less than a predetermined threshold, the system is determined to have a single talk status.

As a result, switch SW1 remains closed to connect canceller 204 to receive signal e(n) and switch SW2 remains closed to connect detector 202 to receive vector W(n). Further, switch SW3 is controlled to be opened so that auxiliary filter 208 does not receive far-end signal x(n).

If If the calculated value |Δp(n)| is greater than the threshold, a double-talk status is detected. One example of a suitable value for the threshold is two times |Δp(n)| in single-talk status. The switches SW1 and SW2 are opened and switch SW3 is closed. As a result, during the double-talk period, canceller 204 stops computing vector W(n). This leads to the further result that vector W(n) can no longer be used to detect the double-talk status of the system. Auxiliary filter 208 is therefore provided to continue monitoring double-talk status. Filter 208 is preferably shorter than the AFIR of detector 204 to simplify the computations of filter 208. Thus, filter 208 begins adaptation of its filter vector W1(n) when the double-talk status is detected. When switch SW2 is opened to disconnect detector 202 from canceller 204, it is moved to a position to connect detector 202 to auxiliary filter 208. Detector 202 therefore commences to compute Δp(n) for the filter vector W1(n) and continues the determination of the double-talk status based on the result of this computation compared to the threshold value. When the result |Δp(n)| for auxiliary filter 208 falls below the threshold for a predetermined period, it is concluded that double-talk has ended. In response, switches SW1 and SW2 are closed and switch SW3 is opened, and echo cancellation and detection for double-talk proceed as described above.

Figure 3:
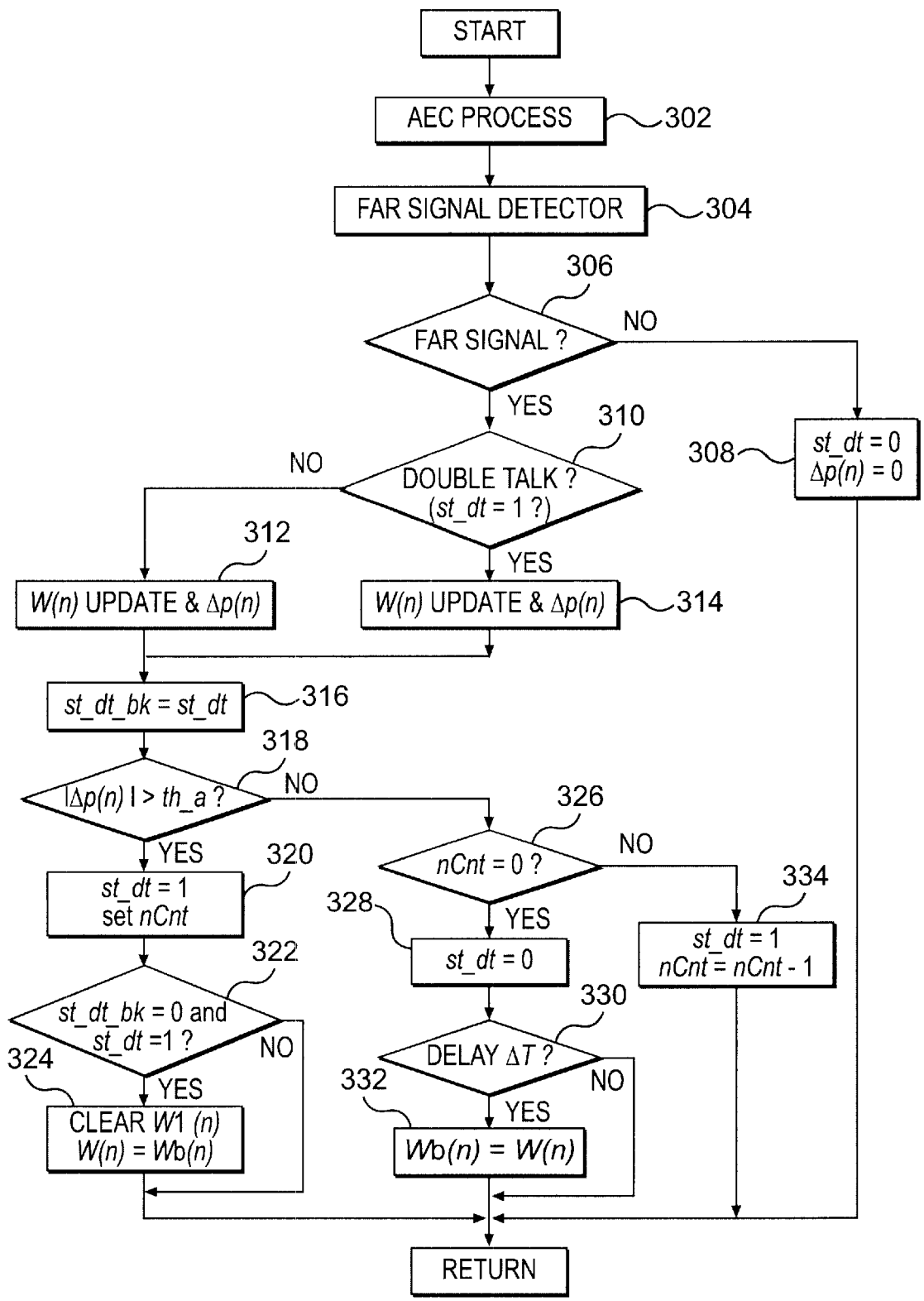
FIG. 3 is a flow chart illustrating a process practiced in the system illustrated in FIG. 2.

FIG. 3 illustrates a flowchart 300 showing the operation of system 200 including detector 202 in greater detail. With reference to flowchart 300, in a step 302 during single talk status, the process of automatic echo cancellation proceeds as described above. In a step 304, the status of the far-end signal is detected by comparing the far-end signal energy with an energy threshold value. In a step 306, it is determined whether the far-end signal is active. If the far-end signal energy is below the threshold value, the far-end signal is considered inactive. As a result, in step 308, system 200 is considered to be in single talk status and a double-talk register value is set to 0: st_dt=0. Further, the value Δp(n) is set to 0: Δp(n)=0.

With reference again to step 306, if the far-end signal is detected to be active, double-talk detection proceeds. At step 310, the current value of the double-talk register is checked and if it indicates single talk status, i.e., st_dt=0, the filter weight vector W(n) is updated by canceller 204 and Δp(n) is computed by detector 202 (step 312). With reference again to step 310, if st_dt=1, then a double-talk status exists. In this case, switches SW1 and SW2 are opened and switch SW3 is closed. As a result, canceller 204 stops adapting of filter vector W(n). Also, in step 314, auxiliary filter 208 operates to compute filter vector W1(n) and detector 202 computes Δp(n) based on vector W1(n).

In step 316, the current value of st_dt is saved to a back-up register st_dt_bk: st_dt_bk=st_dt.

In step 318, the current value of |Δp(n)| is compared to a threshold value th_a. If the threshold value is exceeded, double-talk status is determined to exist and the double-talk status register is set to 1: st_dt=1 (step 320). Upon that detection, a double-talk delay counter nCnt is reset, for example to 0.25 seconds.

Next at step 322, it is determined if both st_dt_bk=0 and st_dt=1 which, if true, would mean that the status has changed to double-talk on this iteration of system operation. If this is the case, in step 324 a previously stored reliable back-up value of vector W(n), i.e., Wb(n) replaces the current value of W(n). Also, the filter vector W1(n) of auxiliary filter 208 is initialized. The process then returns to its start. As used herein, the start of the process is the start initiated by the next digital sampling.

In step 318, if the current value of |Δp(n)| is less than or equal to the threshold value which would indicate single talk status, the current value of the counter nCnt is checked (step 326). If the counter is at 0, the double-talk status register is set to 0 (step 328) to indicate single talk status. Also, during single talk status, the value of the adaptive filter vector W(n) is periodically saved at arbitrary time interval ΔT, as the back-up value Wb(n). (Steps 330 and 332). Following step 332, the process returns to the start.

At step 326, if the current counter value is not 0, the double-talk status register is set maintained at 1 and the counter value is decremented (step 334). Thus, even though double-talk status is determined to have ended at step 318, the system continues to operate in double-talk status for the duration of counter nCnt. This is done to ensure that the double-talk status has ended. Following step 334, the process returns to the start.

The structure shown in FIG. 2 can be implemented in a digital signal processor such as an ADSP2181 digital signal processor and programmed to perform the computations and determinations described herein.

Performance of double-talk detection according to the present invention was tested and compared to performance of conventional detection techniques. In the test, speech signals were sampled at an 8 KHz sampling rate and the signals were recorded in a 12 m×12 m room. The far-end signal x(n) was received from a telephone. The echo signal c(n) and the local source signal s(n) were separately received by a microphone. The near-end signal d(n) was a mixed signal containing signals s(n) and c(n).

Figure 4A:
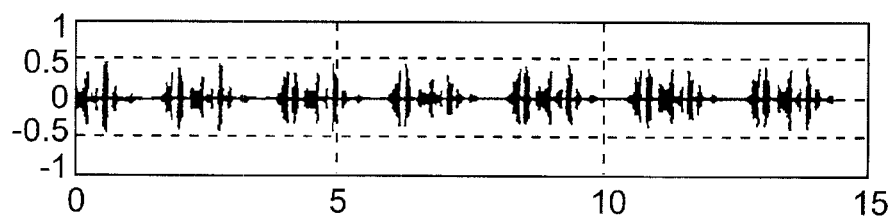
FIGS. 4(a)–4(e) illustrate graphical plots of signals used in a simulation of operation of a communication system in accordance with the present invention.
Figure 4B:
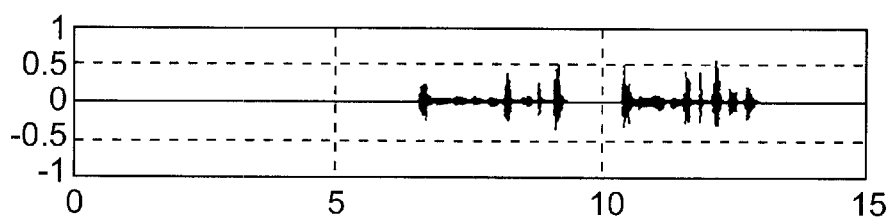
Figure 4C:
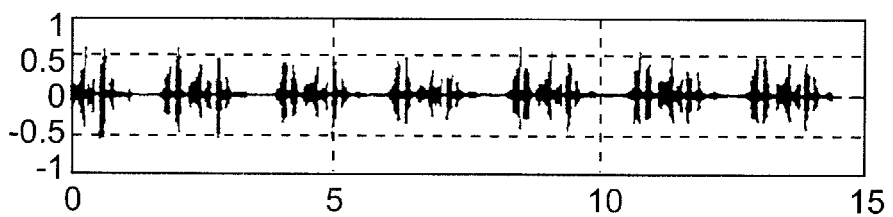
Figure 4D:
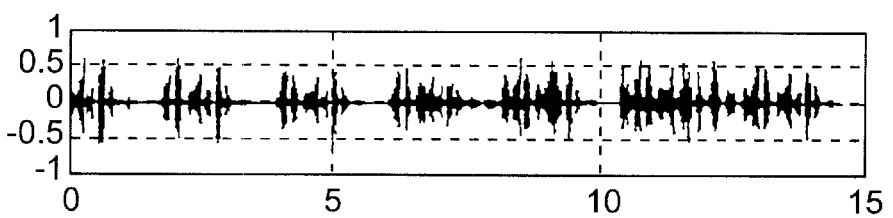
Figure 4E:
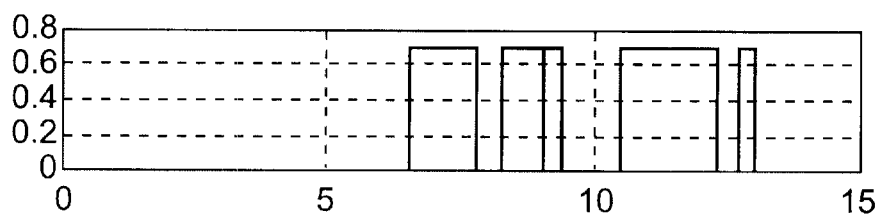

FIGS. 4(a)–4(e) respectively illustrate the signals occurring in the test system. The abscissa in each plot is time in seconds. The ordinates in the plots are scaled to amplitude values. FIG. 4(a) is a plot of the far-end signal x(n). FIG. 4(b) is a plot of local source signal s(n). FIG. 4(c) is a plot of the echo signal c(n). FIG. 4(d) is a plot of the mixed near-end signal d(n). FIG. 4(e) is a plot of time periods when double-talk actually occurred. Thus, in FIG. 4(e) when the plot assumes a positive value of approximately 0.7, double-talk status exists.

Figure 5A:
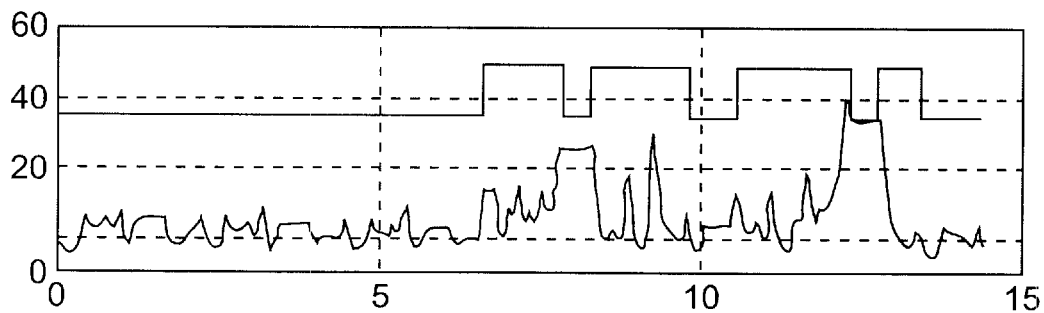
FIGS. 5(a)–5(d) illustrate the results of simulation of double-talk detectors constructed according to conventional techniques and according to the present invention, in an environment substantially free of white noise.
Figure 5B:
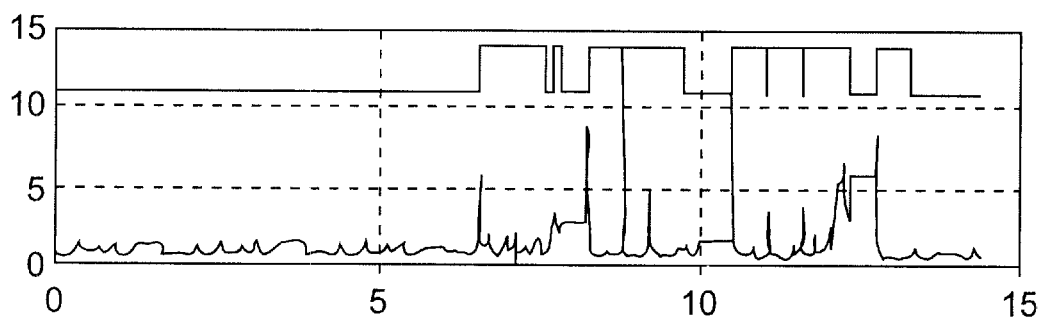
Figure 5C:
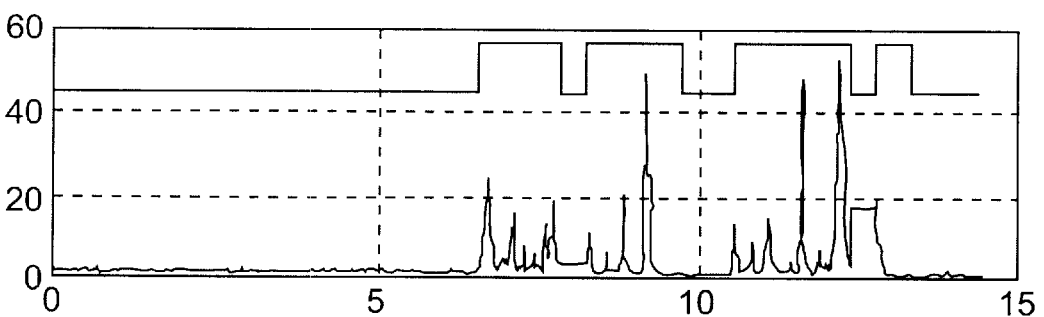
Figure 5D:
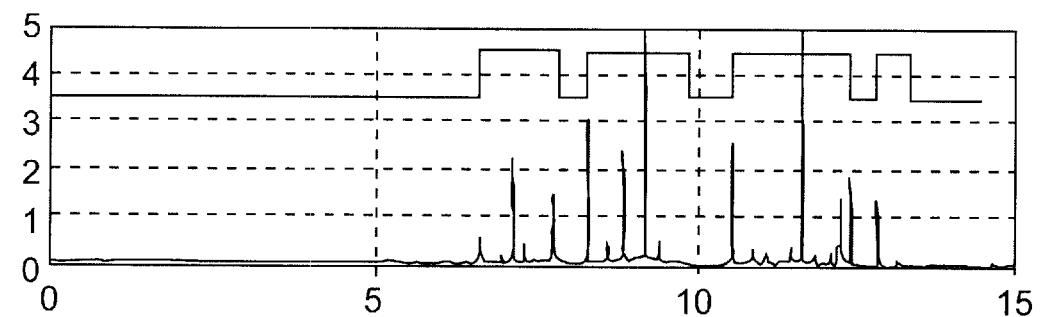
Figure 6A:
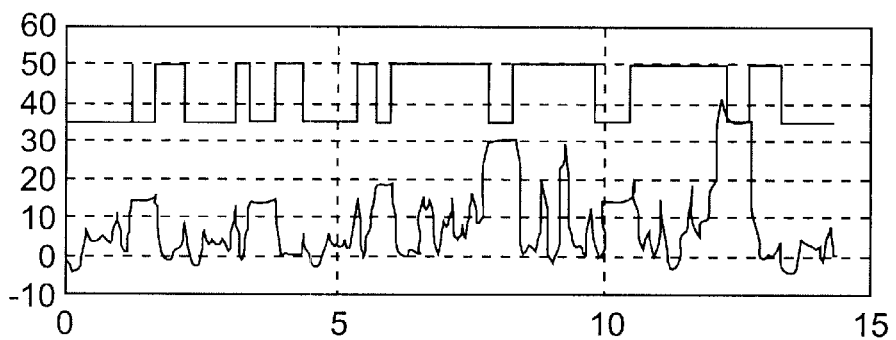
FIGS. 6(a)–6(d) illustrate the results of simulation of double-talk detectors constructed according to conventional techniques and according to the present invention in an environment in which 20 dB of white noise was added.
Figure 6B:
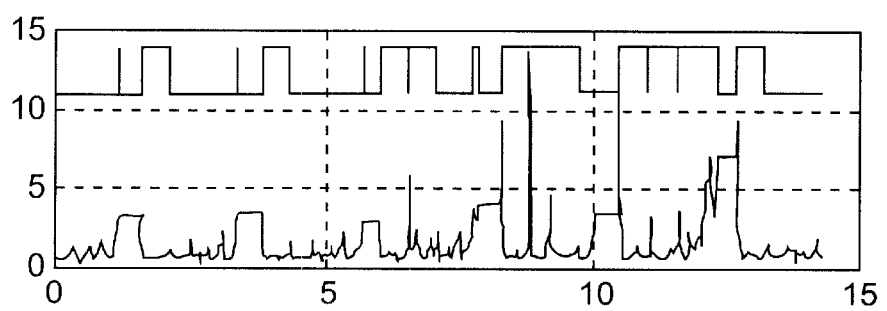
Figure 6C:
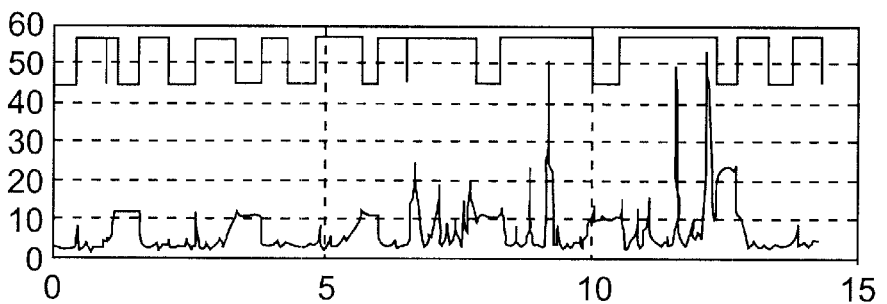
Figure 6D:
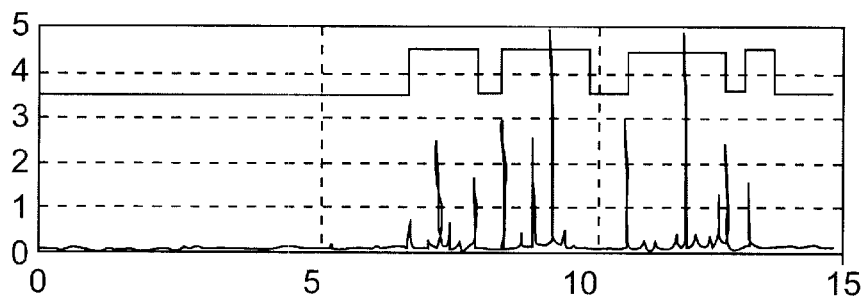

FIGS. 5(a)–5(c) illustrate double-talk detection status for the above-described power type, correlation type, and LPC type conventional detection systems, respectively, while FIG. 5(d) illustrates detection status for the system according to the present invention. All systems were tested under the conditions illustrated in FIGS. 4(a)–4(e). In each of FIGS. 5(a)–5(d), the abscissa is time. The upper rectangular plot assumes a high value when double-talk is detected. The lower plot in FIG. 5(a) is the power ratio of the near-end and far-end signal scaled by 10*log. The units for the lower plot in FIG. 5(a) are in dB. The lower plot in FIG. 5(b) is the average cross-correlation of error signal and far-end signal. The units for the lower plot of FIG. 5(b) are dimensionless. The lower plot of FIG. 5(c) is the ratio of the residual error rates of the near-end and far-end signals and is dimensionless. In FIG. 5(d), the lower plot is the value |Δp(n)| as determined by detector 202.

FIGS. 5(a)–5(d) correspond to the near-end environment being substantially free of white noise.

FIGS. 6(a)–6(d) illustrate data for substantially the same plots as shown in FIGS. 5(a)–5(d), respectively, except that the test was performed with 20 dB of white noise added to the near-end environment.

Tables 1(a) to 1(e) summarize the test results shown in FIGS. 5(a)–5(d) and 6(a)–6(d) as well as for other test conditions. In Tables 1(a)–1(e), $\alpha$ represents a detection rate defined by a ratio of correctly detected double-talk interval length to the actual double-talk interval length. The symbol $\beta$ represents an error rate defined as a ratio of incorrectly detected double-talk interval lengths to the total speech interval length. The symbol POWR denotes the power type method, the symbol CORR denotes the correlation type method, the symbol LPC denotes the LPC type method, and the symbol SNFW denotes the method according to the present invention.

Table 1(a) corresponds to the test with no white noise, while Tables 1(b)–1(e) summarize results for a variety of white noise conditions. Thus, Table 1(a) corresponds to the results of FIGS. 5(a)–5(d) and Table 1(b) corresponds to the results of FIGS. 6(a)–6(d). As seen in the results, the detector according to the present invention has the lowest error rate $\beta$ and shows substantially better results than the other types of double-talk detectors when more than 5 dB of noise is present.

TABLE 1(a)

| Rate | Type | | | |
|---|---|---|---|---|
| | POWR | CORR | LPC | SNFW |
| $\alpha$ | 98.38% | 83.46% | 99.41% | 99.34% |
| $\beta$ | 6.21% | 9.31% | 5.87% | 5.76% |

No noise.

TABLE 1(b)

| Rate | Type | | | |
|---|---|---|---|---|
| | POWR | CORR | LPC | SNFW |
| $\alpha$ | 99.67% | 83.56% | 99.54% | 99.34% |
| $\beta$ | 21.56% | 20.11% | 22.87% | 5.78% |

SNR = 20 dB White Noise

TABLE 1(c)

| Rate | Type | | | |
|---|---|---|---|---|
| | POWR | CORR | LPC | SNFW |
| $\alpha$ | 100% | 97.08% | 100% | 99.30% |
| $\beta$ | 26.16% | 23.16% | 50.62% | 13.32% |

SNR = 15 dB White Noise

TABLE 1(d)

| Rate | Type | | | |
|---|---|---|---|---|
| | POWR | CORR | LPC | SNFW |
| $\alpha$ | 100% | 97.36% | 100% | 99.34% |
| $\beta$ | 37.33% | 36.51% | 51% | 35.56% |

SNR = 10 dB White Noise

TABLE 1(e)

| Rate | Type | | | |
|---|---|---|---|---|
| | POWR | CORR | LPC | SNFW |
| $\alpha$ | 100% | 97.92% | 100% | 100% |
| $\beta$ | 48.49% | 48.89% | 51% | 47.59% |

SNR = 5 dB White Noise

While the present invention has been disclosed for use in a system experiencing acoustic echo, it can be practiced with equal effectiveness in a system experiencing network echo.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A double-talk detector for use with an echo canceller having an adaptive filter, the adaptive filter coupled to receive a far-end signal and an error signal which is a difference between a near-end signal and an output signal of the adaptive filter, the adaptive filter adapting a weight vector used for generating the filter output signal to minimize the error signal, the double-talk detector comprising:

means for detecting an increase of a squared norm of the adaptive filter weight vector; and means for determining whether the increase of the squared norm exceeds a predetermined value corresponding to a double-talk condition.

2. The double-talk detector of claim 1 wherein the means for detecting an increase includes means for determining a difference between values of the squared norm at successive times.

3. The double-talk detector of claim 1 wherein the means for detecting an increase includes means for determining a difference value $\Delta p(n)$ between values of the squared norm at successive times according to:

$$\Delta p(n) = 2\tilde{\mu} e(n) y(n) + [\tilde{\mu} e(n)] \text{hu } 2 |X(n)|^2$$

wherein e(n) is the error signal, y(n) is the filter output signal,

X(n) is a far-end input signal vector, and $\mu$ is related to a step size $\mu_0$ used by the adaptive filter according to $$\tilde{\mu} = \frac{\mu_o}{|X(n)|^2}.$$

4. An echo canceller for canceling from a near-end signal an echo received in a far-end signal, comprising:

an adaptive filter coupled to receive the far-end signal and an error signal which is a difference between the near-end signal and an output signal of the adaptive filter, the adaptive filter including means for adapting a weight vector, used for generating the filter output signal, to minimize the error signal; and a double-talk detector coupled to receive the weight vector and detect an increase of a squared norm of the weight vector, the detector including means for determining whether the increase exceeds a predetermined value corresponding to a double-talk condition.

5. The echo canceller of claim 4 wherein the detector includes means for determining a difference between values of the squared norm at successive times.

6. The echo canceller of claim 4 wherein the detector includes means for determining a difference value $\Delta p(n)$ between values of the squared norm at successive times according to:

$$\Delta p(n) = 2\tilde{\mu} e(n) y(n) + [\tilde{\mu} e(n)] \text{hu } 2 |X(n)|^2 \tag{6}$$

wherein e(n) is the error signal, y(n) is the filter output signal,

X(n) is a far-end input signal vector, and $\mu$ is related to a step size $\mu_0$ used by the adaptive filter according to $$\tilde{\mu} = \frac{\mu_o}{|X(n)|^2}.$$

7. The echo canceller of claim 4 wherein the adaptive filter is responsive to the determination of the double-talk detector of a double-talk condition to stop adapting the weight vector.

8. The echo canceller of claim 7 further including an auxiliary filter for determining an auxiliary filter weight vector during the double-talk condition.

9. A method for detecting double-talk in an echo canceller for canceling from a near-end signal an echo received in a far-end signal, comprising:

receiving the far-end signal and an error signal which is a difference between the near-end signal and an adaptive filter output signal;

adapting an adaptive filter weight vector to generate the output signal with a value to minimize the error signal;

detecting an increase of a squared norm of the weight vector; and determining that a double-talk condition exists when the increase exceeds a predetermined value.

10. The method of claim 9 wherein detecting the increase includes determining a difference between values of the squared norm at successive times.

11. The method of claim 9 wherein detecting the increase includes determining a difference value between values of the squared norm at successive times according to:

$$\Delta p(n) = 2\tilde{\mu} e(n) y(n) + [\tilde{\mu} e(n)] \text{hu } 2 |X(n)|^2 \tag{6}$$

wherein e(n) is the error signal, y(n) is the filter output signal,

X(n) is a far-end input signal vector, and $\mu$ is related to a step size $\mu_0$ used by the adaptive filter according to $$\tilde{\mu} = \frac{\mu_o}{|X(n)|^2}.$$

12. The method of claim 9 further including stopping the adapting of the weight vector when the double-talk condition is determined to exist.

13. The method of claim 12 further comprising:

generating an auxiliary filter weight vector during the double-talk condition;

detecting an increase of a squared norm of the auxiliary filter weight vector; and determining whether the double-talk condition continues to exist based on comparing the detected increase in the auxiliary filter weight vector squared norm with the predetermined value.

* * * * *